(12) United States Patent
Breviere et al.

(10) Patent No.: US 7,648,264 B2
(45) Date of Patent: Jan. 19, 2010

(54) ELECTRIC FOOD PREPARATION APPLIANCE HAVING A SUPPORT FOR A MIXING ACCESSORY

(75) Inventors: Marc Breviere, Maidenhead (GB); Cyril Durris, Montignac (FR); Marc Suberbie, Momeres (FR)

(73) Assignee: SEB S.A., Ecully (FR)

( * ) Notice: Subject to any disclaimer, the term of this patent is extended or adjusted under 35 U.S.C. 154(b) by 0 days.

(21) Appl. No.: 12/273,247

(22) Filed: Nov. 18, 2008

(65) Prior Publication Data

US 2009/0129200 A1    May 21, 2009

(30) Foreign Application Priority Data

Nov. 19, 2007    (FR) .................................. 07 08108

(51) Int. Cl.
*A47J 43/046*    (2006.01)
(52) U.S. Cl. ........................................ 366/205; 366/314
(58) Field of Classification Search ................ 366/205, 366/206, 314; 241/282.1–382.2; 99/348
See application file for complete search history.

(56) References Cited

U.S. PATENT DOCUMENTS

| | | | | |
|---|---|---|---|---|
| 3,346,029 A | * | 10/1967 | Harris, Jr. .............. | 241/199.12 |
| 4,561,782 A | * | 12/1985 | Jacobsen et al. ............. | 366/349 |
| 6,832,543 B2 | * | 12/2004 | Siano et al. .................... | 99/340 |
| 7,040,799 B2 | * | 5/2006 | Pryor, Jr. ..................... | 366/199 |
| 7,213,965 B2 | * | 5/2007 | Daniels, Jr. .................. | 366/192 |
| 2004/0264294 A1 | * | 12/2004 | Pryor, Jr. ..................... | 366/129 |
| 2005/0207271 A1 | * | 9/2005 | Beesley ....................... | 366/206 |
| 2008/0159070 A1 | * | 7/2008 | Cocchi et al. ................ | 366/343 |
| 2009/0129200 A1 | * | 5/2009 | Breviere et al. ............. | 366/205 |

FOREIGN PATENT DOCUMENTS

| | | | |
|---|---|---|---|
| FR | 2 882 640 A1 | | 9/2006 |
| GB | 2 347 095 A | | 8/2000 |
| WO | 00/48498 | * | 8/2000 |
| WO | 2005/102127 A1 | | 11/2005 |

* cited by examiner

*Primary Examiner*—Charles E Cooley
(74) *Attorney, Agent, or Firm*—Browdy and Neimark, PLLC

(57) ABSTRACT

An electric food preparation appliance composed of: a jar having a bottom and an open top; a rotary working tool installed in the jar to be driven in rotation through the bottom of the jar; a lid for closing the top of the jar and having an opening; a mixing accessory constructed to be installed in the jar through the opening; and a side support member provided to hold the mixing accessory when the mixing accessory is not installed in the jar.

20 Claims, 5 Drawing Sheets

ELECTRIC FOOD PREPARATION APPLIANCE HAVING A SUPPORT FOR A MIXING ACCESSORY

BACKGROUND OF THE INVENTION

The present invention relates to the field of electric food preparation appliances comprising a rotary tool, typically presenting blades, installed for rotation in a work container. These appliances are commonly called blenders and the work containers are known as jars.

The present invention more particularly relates to appliances of the above-mentioned type having a mixing accessory.

U.S. Pat. No. 7,040,799 discloses a food preparation appliance comprising a mixing accessory assembled in the lid of the blender jar. For this purpose the mixing accessory comprises a flange. The mixing accessory presents a hollow sleeve prolonged at its lower end by a spoon.

BRIEF SUMMARY OF THE INVENTION

The present invention facilitates the use of an appliance of the above-mentioned type.

In particular, the present invention improves the ergonomics of an appliance of the above-mentioned type.

Specifically, the invention provides an electric food preparation appliance comprising a rotary working tool assembled in a jar, and a mixing accessory constructed to be installed in a closeable opening provided in a lid of the jar, the mixing accessory extending then into the jar, the rotary working tool being driven through the bottom of the jar, wherein the appliance further comprises a side, or lateral, support member provided to hold the mixing accessory when it is not being used.

This provision makes it possible to facilitate the use of the appliance while making the mixing accessory easily and conveniently accessible. The user can begin food preparation by introducing the ingredients to be blended through the opening in the lid, or by first removing the lid. The mixing accessory, being stored on the side support, is immediately and conveniently available for use. The user can then install the mixing accessory in the opening provided in the lid so that the accessory can stir the preparation while it is being blended. The mixing accessory can approach or even reach, or contact, the wall of the jar, to detach ingredients from the wall. After use, the user can, if desired, rinse the mixing accessory and/or to position it back on the side support for the next use.

According to a preferred embodiment, the mixing accessory presents a hollow sleeve forming an emerging conduit. This provision allows for the addition of ingredients when the mixing accessory is in place in the opening in the lid.

Advantageously then, the hollow sleeve is adapted to be installed on the side support. This provision makes it possible to avoid contact between the side support and the lower part of the mixing accessory, designed to come in contact with food in the jar.

Advantageously still, to limit handling of the mixing accessory and to facilitate the filling of ingredients in the jar, the hollow sleeve is shaped to form a funnel.

Advantageously still, to avoid splashing of the mixture out of the jar during operation of the appliance, a blocking, or closing, element is provided to close the upper end of the hollow sleeve.

Advantageously then, the blocking element can be configured to form a container. The blocking element can then be used as a measuring cap.

Advantageously still, to avoid splashing out of the jar during operation of the appliance when the mixing accessory is not installed, the blocking element can be used to close the opening in the lid.

Advantageously then, to facilitate withdrawal of the blocking element, the lid is formed to have two side recesses adjacent to the opening.

Advantageously still, to facilitate mixing of the ingredients in the jar or to facilitate the introduction of ingredients into the jar, the mixing accessory forms a spoon.

Advantageously then, the spoon is made of polypropylene. This material has the advantage of being less rigid than ABS, SAN, or polycarbornate, which facilitates scraping of the sides of the jar, and also the installation of the mixing accessory on, and withdrawal from, the support. This material also has the advantage of being easily overmolded on a more rigid material such as polycarbonate. Alternatively, the spoon could in particular be made of a flexible material, such as for example silicone.

Advantageously then, the mixing accessory has a hollow sleeve made at least partially of a material that is more rigid than the material of the spoon.

According to an advantageous embodiment, the appliance comprises a base for receiving the jar. The motor of the appliance is housed in the base. Alternatively, the motor could be integrated into the blender jar.

Then, according to a preferred embodiment, the side support extends from the base. This provision makes it possible to withdraw the blender jar from the base while leaving the mixing accessory in place on the support. Pouring of the contents out of the jar is then facilitated.

Advantageously, the side support is integral with a part forming a ring. This provision makes it possible to facilitate fabrication of the side support.

Advantageously, the side support is removably mounted with respect to a case, or housing, that is a component of the base. This provision makes it possible to facilitate the cleaning of the side support and to facilitate fabrication of the side support.

Advantageously then the side support is constructed to occupy any one of several positions relative to the case. This provision in particular makes it possible to place the support in a suitable manner depending on whether the user is right-handed or left-handed.

Alternatively, the side support could in particular extend from the blender jar or from the lid.

Advantageously still, the lower end of the mixing accessory in place on the side support is arranged laterally at a distance from the lower part of the appliance. This provision makes it possible to prevent liquid that might remain present on the mixing accessory from flowing or dripping onto the lower part of the appliance.

The invention also provides a mixing accessory especially provided for an electric food preparation appliance according to one at least of the above-mentioned embodiments, by the fact that the aforementioned mixing accessory has a hollow sleeve forming a funnel.

The invention also provides a mixing accessory especially provided for an electric food preparation appliance according to one at least of the above-mentioned embodiments, by the fact that the aforementioned mixing accessory has a spoon made of polypropylene.

The invention also provides a mixing accessory especially provided for an electric food preparation appliance according to one at least of the above-mentioned embodiments, by the fact that the aforementioned mixing accessory has a spoon made of a flexible material.

Advantageously also, the mixing accessory is formed with a hollow sleeve forming a funnel.

Advantageously still, the mixing accessory has a flange. This provision makes it possible to facilitate the installation of the mixing accessory in the opening in the lid of the appliance.

BRIEF DESCRIPTION OF THE DRAWINGS

The invention will be better understood from the following description of a preferred embodiment and two alternatives, presented on a purely non-limiting basis and illustrated in the annexed figures, in which.

DETAILED DESCRIPTION OF THE INVENTION

Figure 1:
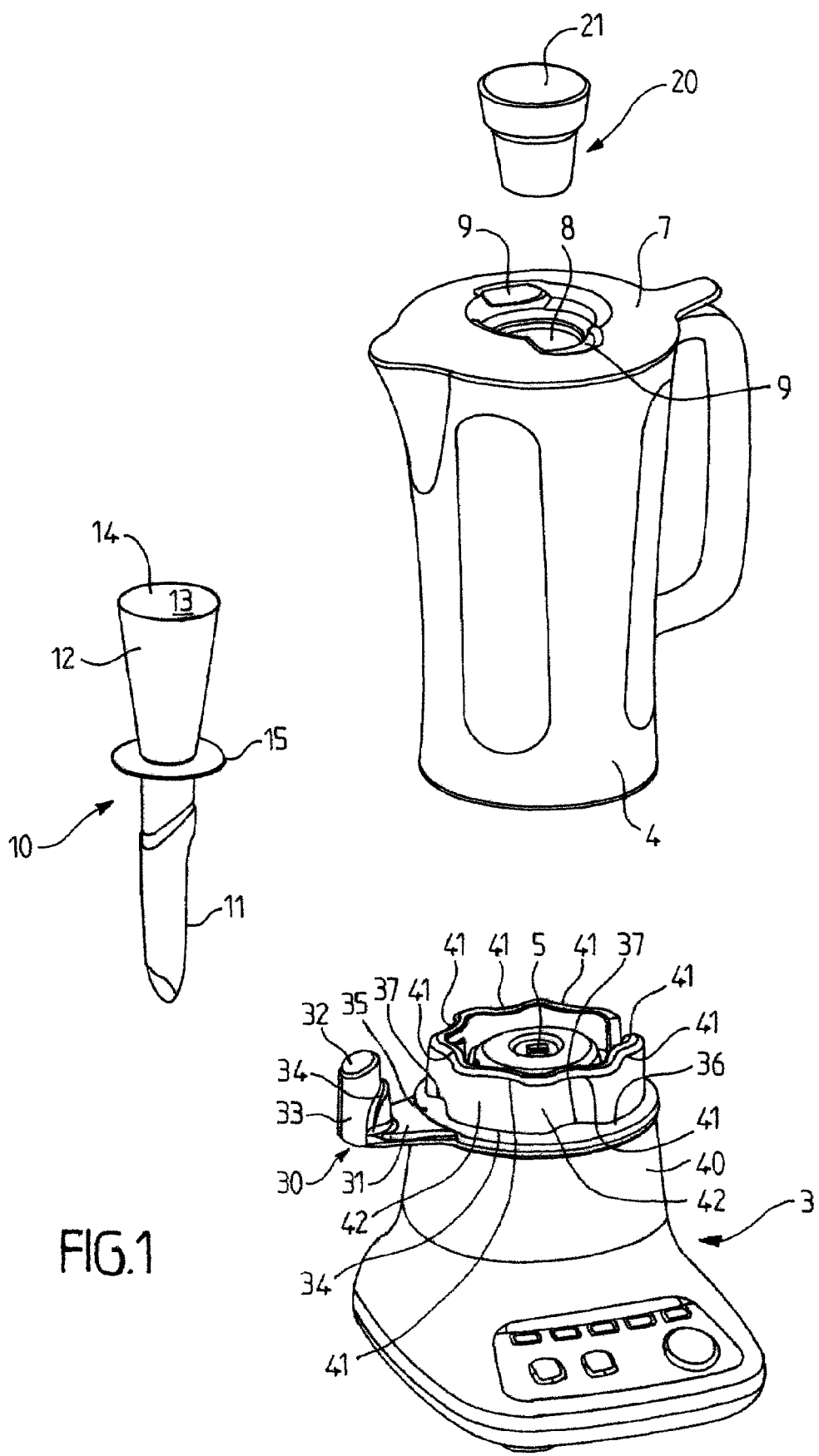
FIG. 1 is an exploded perspective view of a first embodiment of a food preparation appliance according to the invention having a side support for a mixing accessory according to the invention.
Figure 2:
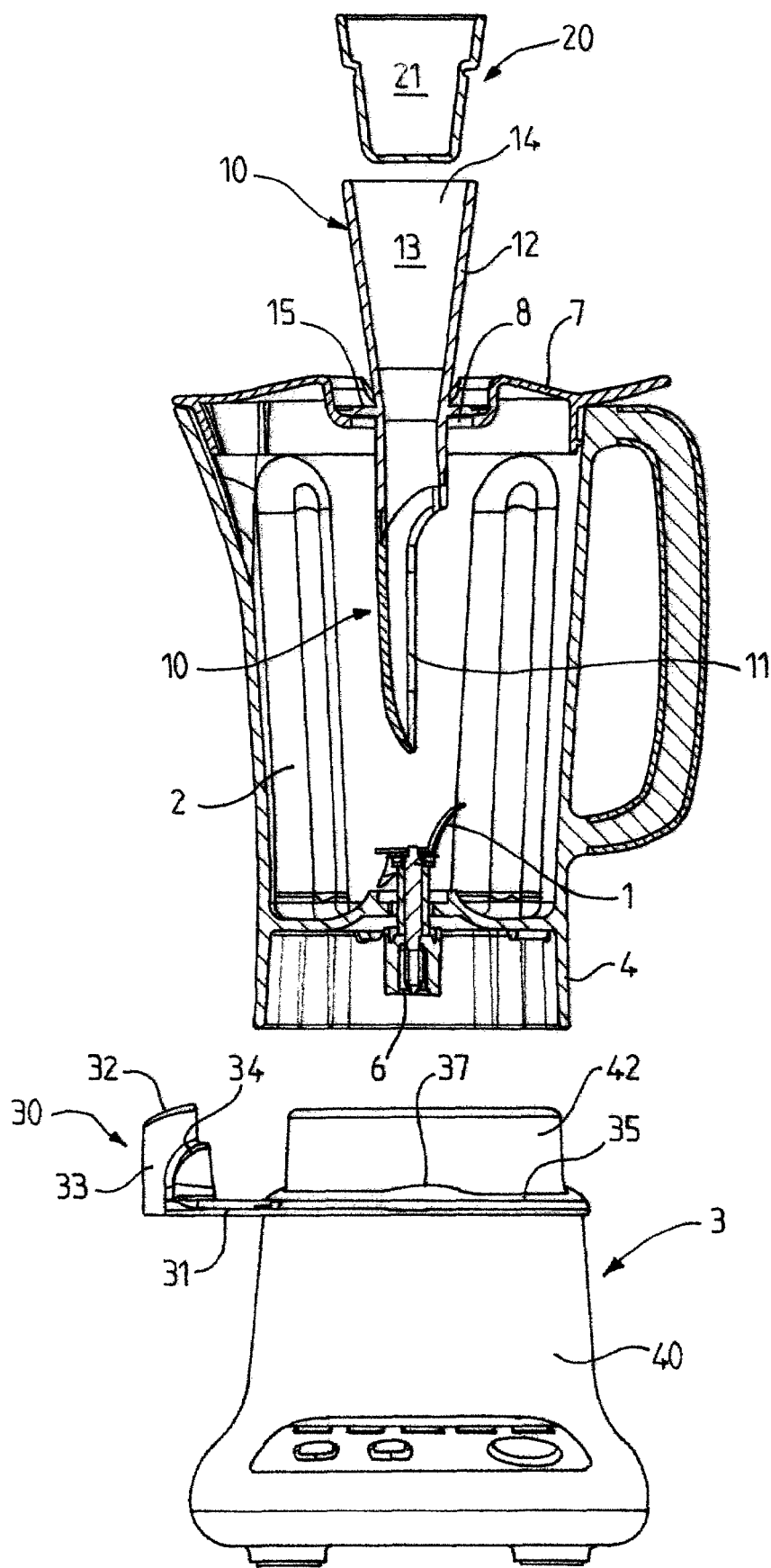
FIG. 2 is a partially exploded front elevational view of the embodiment of FIG. 1, in which the mixing accessory is engaged in the opening in the lid of the blender jar.

The electric food preparation appliance illustrated in FIGS. 1 and 2 comprises a rotary working tool, or blades, 1 installed in a jar 2. If desired, rotary working tool 1 can be removably installed.

More particularly, the appliance comprises a base 3 receiving a work container 4 forming jar 2. A motor (not shown) is housed in base 3. The motor is coupled with a drive mechanism 5 designed to cooperate with a drive element 6 disposed under blender jar 2 and connected to rotary working tool 1. Thus, as is clearly visible in FIG. 2, rotary working tool 1 is actuated through the bottom of jar 2 by means of drive element 6.

A lid 7 is associated with jar 2. Lid 7 presents an opening 8 advantageously placed at the bottom of a depression, or recess. Opening 8 extends essentially above rotary working tool 1 installed in jar 2. Lid 7 has two diametrically opposed side recesses 9 adjacent to opening 8.

The appliance also comprises a mixing accessory 10, shown in FIGS. 1 to 4. Mixing accessory 10 is adapted to be installed in opening 8. As is clearly visible in FIG. 2, mixing accessory 10 extends then into jar 2.

Mixing accessory 10 forms a spoon 11. Advantageously, spoon 11 can touch the walls of jar 2 when mixing accessory 10 is in place in opening 8 of lid 7.

Mixing accessory 10 presents a hollow sleeve 12 forming an emerging conduit 13. Thus hollow sleeve 12 allows food ingredients to be introduced into jar 2 from the upper end of mixing accessory 10 installed in opening 8 of lid 7. More particularly, hollow sleeve 12 forms a funnel 14. The introduction of ingredients into mixing accessory 10 in place in opening 8 of lid 7 is thus facilitated. Funnel 14 is provided at the end of conduit 13 opposed to spoon 11. The other end of conduit 13 emerges near spoon 11.

Mixing accessory 10 is provided with a flange 15 designed to be supported on lid 8 around opening 7. Flange 15 is arranged between spoon 11 and funnel 14.

If desired, hollow spoon 11 and handle 12 can be made of different materials. As is clearly visible in FIGS. 2 and 3, mixing accessory 10 comprises a tubular part 16 forming funnel 14, flange 15 and the major part of conduit 13. Tubular part 16 is advantageously made of a rigid material, such as for example polycarbonate. Mixing accessory 10 also comprises a part 17 forming spoon 11 and part of conduit 13 from which spoon 11 projects. Part 17 is made of a more flexible material, such as for example polypropylene. Part 17 can advantageously be overmolded on tubular part 16. Thus, mixing accessory 10 at least partially present a hollow sleeve 12 made of a material more rigid than the material from which spoon 11 is made.

Figure 3:
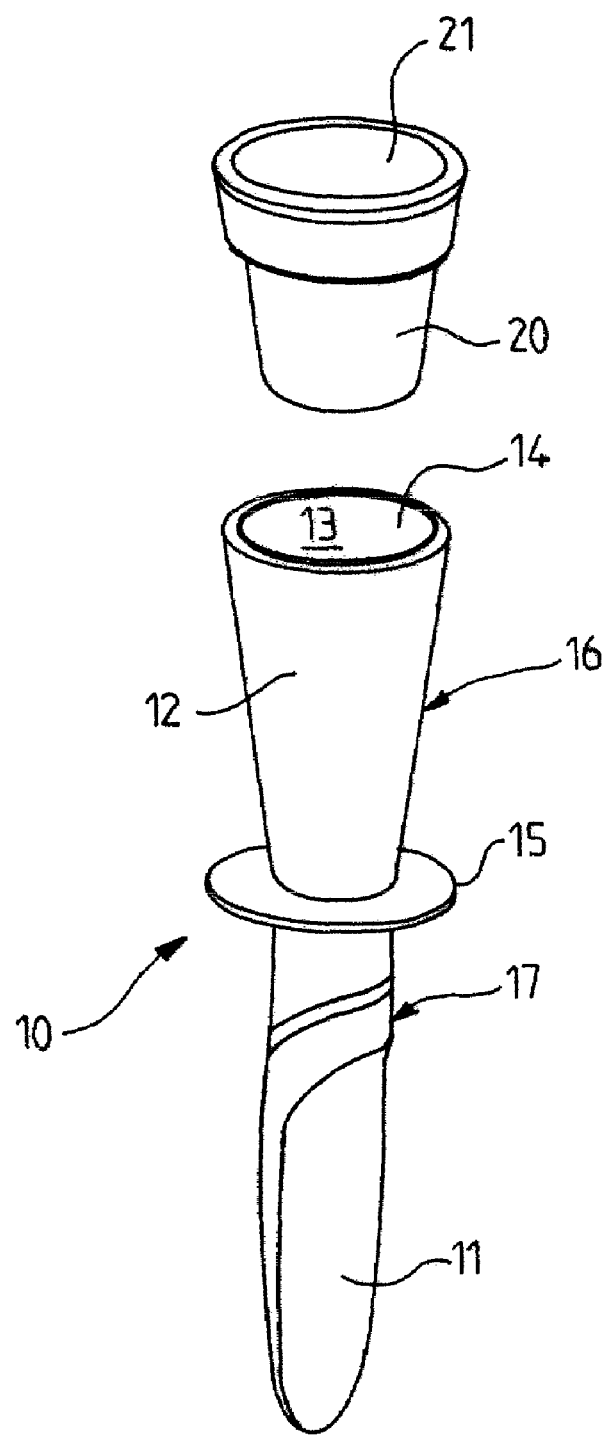
FIG. 3 is an exploded perspective view the mixing accessory and blocking element of FIGS. 1 and 2.
Figure 4:
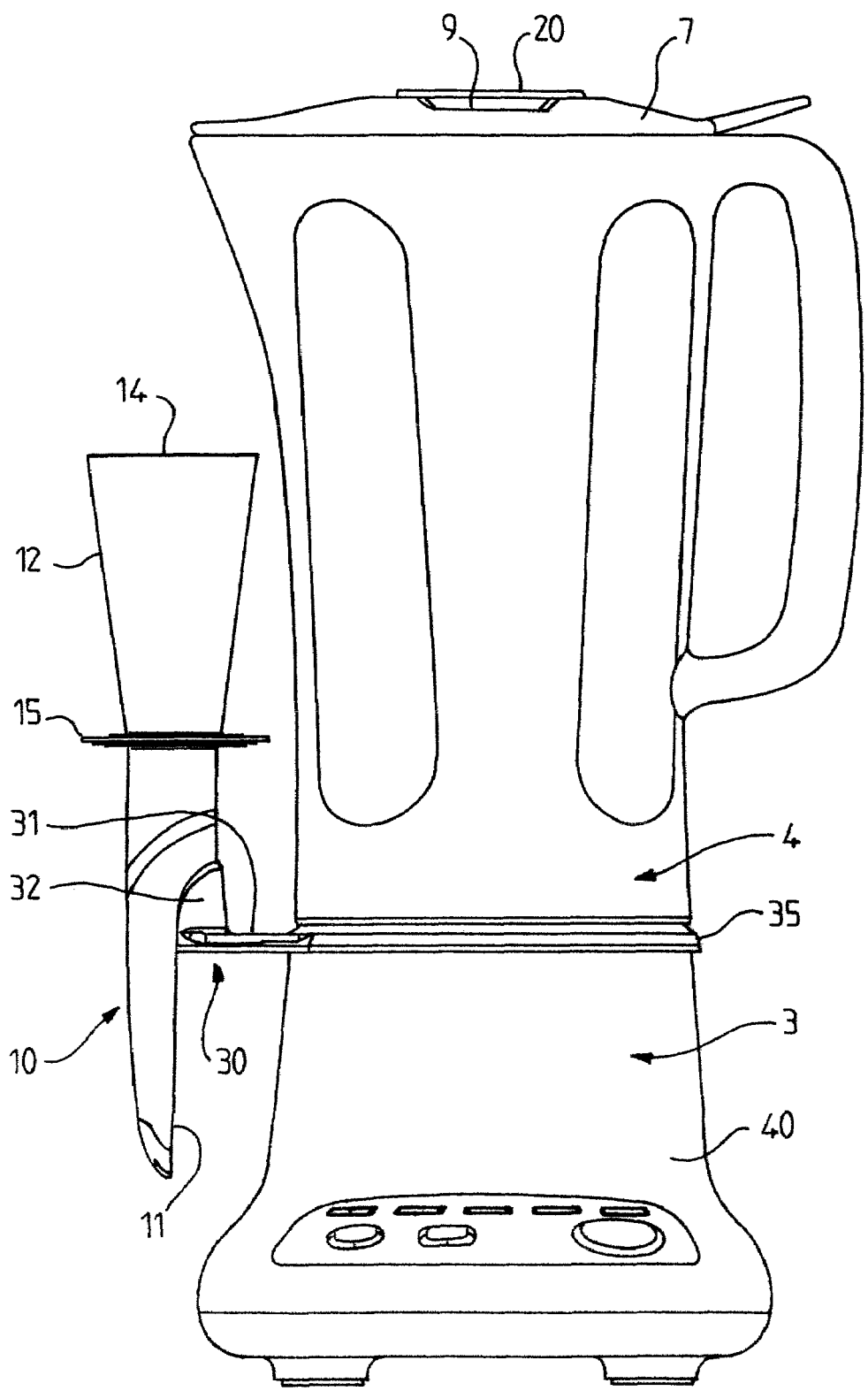
FIG. 4 is a front elevational view of the appliance illustrated on FIGS. 1 and 2, with the mixing accessory in place on the side support.

The appliance also has a blocking element 20, shown in FIGS. 1 to 4. Blocking element 20 is provided to be placed in opening 8 of lid 7, as shown in FIGS. 1 and 4. Moreover, blocking element 20 is provided to be engaged in one end of hollow sleeve 12. More specifically, blocking element 20 is constructed to be placed in the end of hollow sleeve 12 opposed to spoon 11, as shown in FIGS. 2 and 3.

As shown in FIG. 4, blocking element 20 can be placed in opening 8 of lid 7 in place of mixing accessory 10.

Blocking element 20 forms advantageously a container 21. Blocking element 20 can in particular be provided with level markings, or graduations, and can thus form a measuring cap.

Alternatively, the blocking element 20 can be provided at its bottom with at least one opening for the flow of liquid into jar 2 when blocking element 20 is in place in opening 8 or in mixing accessory 10.

The appliance further comprises a side support 30 designed to receive mixing accessory 10. Side support 30 presents an arm 31 surmounted by a protuberance 32. Protuberance 32 advantageously presents a storage body 33 and a support body 34. Hollow sleeve 12 is configured to be engaged on side support 30.

More particularly, side support 30 extends from base 3. According to the preferred embodiment illustrated in FIGS. 1, 2 and 4, side support 30 is secured to, or integral with, a piece 35 forming a ring 36. Side support 30 and piece 35 are advantageously mounted to be removable from a case 40 forming a component of base 3. For this purpose, ring 36 presents internal shaped regions, or conformations, e.g. protrusions, 37 adapted to cooperate with mating side shaped regions, or conformations, e.g. recesses, 41 formed on an upper part 42 of case 40. Side support 30 is advantageously adapted to occupy any one of several possible positions relative to case 40. For the preferred embodiment shown in FIG. 1, there are four internal conformations 37 and eight side conformations 41. Thus, the user can choose from among eight available positions for side support 30 on case 40.

Advantageously, the lower end of mixing accessory 10, when in place on side support 30, is disposed laterally at a distance from the lower part of the appliance, as shown in FIG. 4.

Mixing accessory 10 makes it possible to use spoon 11 to pour ingredients into jar 2 through opening 8. Mixing accessory 10 can also be constructed to provide funnel 14 through which ingredients can be poured into conduit 13 in jar 2 through opening 8. Mixing accessory 10, when in place in jar 2, can also be used to mix the ingredients present in jar 2 and/or to scrape food off of the internal wall of jar 2, in particular during preparation of a puree, for example of chickpeas.

Blocking element 20 can be used to close the upper end of hollow sleeve 12 or to directly seal opening 8 of lid 7.

Side support 30 can be used to receive mixing accessory 10, as shown in FIG. 4, in which hollow sleeve 12 is engaged on side support 30. Storage body 33 is then engaged in the end of conduit 13 adjacent spoon 11 and the upper end of spoon 11 rests on support body 34. If desired, side support 30 can also be used to hold blocking element 20 in an upside down orientation.

The user can choose the orientation of side support 30 relative to case 40 by positioning internal conformations 37 of ring 36 opposite selected side conformations 41 of case 40.

Thus, side support 30 can be placed on the left-hand side of the appliance, as shown in FIGS. 1, 2 and 4, but also on the right-hand side of the appliance, or opposite the front face or the rear face, or in any other intermediate position permitted by internal conformations 37 of ring 36. Side support 30 is thus not necessarily placed on the side of the appliance.

The appliance according to the invention is thus particularly practical to use.

Figure 5:
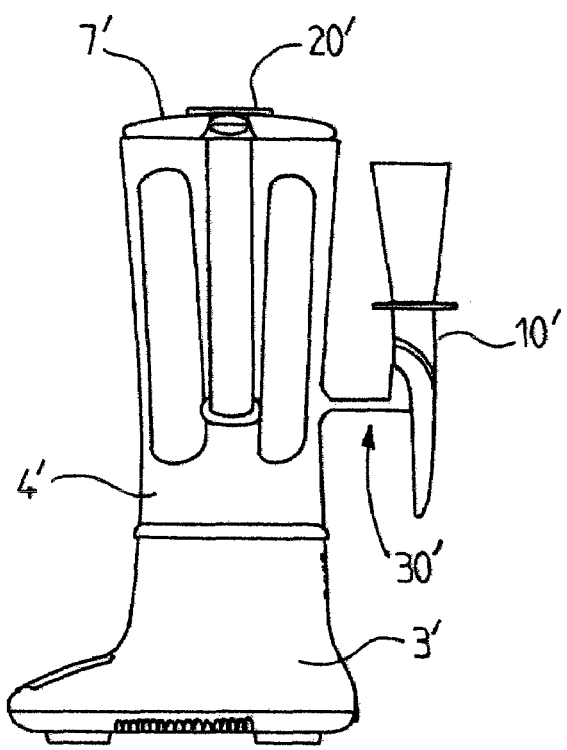
FIGS. 5 and 6 are side elevational views of alternative embodiments of food preparation appliances according to the invention in which the side support extends from, or is integral with, the blender jar and the lid of the blender jar, respectively.

FIG. 5 shows an alternative embodiment differing from the embodiment shown in FIGS. 1 to 4 in that base 3' includes case 40, but does not carry side support 30 or piece 35. Instead, side support 30 is replaced by a side support 30', which is designed to receive mixing accessory 10 and extends from, and may be integral with, blender jar 4'.

Blocking element 20 on lid 7 can also be used with mixing accessory 10, in the same manner as blocking element 20 and mixing accessory 10 of the embodiment illustrated in FIGS. 1 to 4.

As a complementary alternative, side support 30' is not necessarily disposed on the rear face of the appliance as illustrated on FIG. 5.

Figure 6:
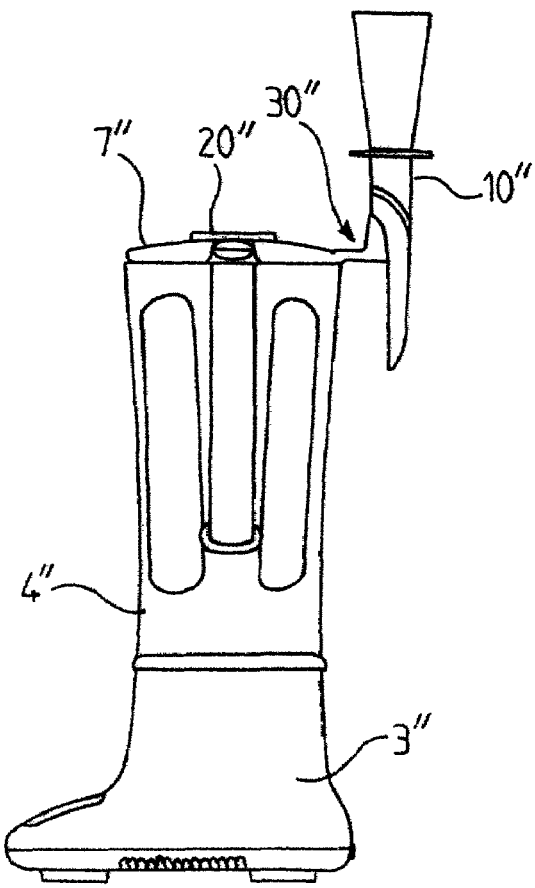

FIG. 6 illustrates an alternative embodiment differing from the embodiment illustrated in FIGS. 1 to 4 in that side support 30" extends from, and may be integral with, lid 7", instead of from blender jar 4, or 4', or from base 3. In the embodiment of FIG. 6, base 3' includes case 40, but does not carry side support 30 or piece 35.

Blocking element 20 on lid 7" can also be used with mixing accessory 10, in the same manner as blocking element 20 and mixing accessory 10 of the embodiment illustrated in FIGS. 1 to 4.

As a complementary alternative, side support 30" is not necessarily positioned at the rear face of the appliance as illustrated on FIG. 6.

As a complementary alternative, spoon 11 could be made of a flexible material, such as for example silicone.

As a complementary alternative, mixing accessory 10 can in particular be made entirely of one material.

As a complementary alternative, mixing accessory 10 need not be provided with flange 15.

As a complementary alternative, the motor could be integrated into blender jar 4, 4' and base 3, 3' can be eliminated.

As a complementary alternative, protuberance 33 does not necessarily extend in a vertical direction, but could in particular be tilted, for example toward the front face of the appliance.

The present invention is by no means limited to the embodiment described and its alternatives, but includes many modifications within the framework of the claims.

This application relates to subject matter disclosed in French Application number FR 07 08108, filed on Nov. 19, 2008, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An electric food preparation appliance comprising: a jar having a bottom and an open top; a rotary working tool installed in said jar to be driven in rotation through said bottom of said jar; a lid for closing said top of said jar and having an opening; a mixing accessory constructed to be installed in said jar through said opening; and a side support member provided to hold said mixing accessory when said mixing accessory is not installed in said jar through said opening, and wherein said mixing accessory, when held by said side support member, has a free end that extends below said side support.

2. The electric food preparation appliance according to claim 1, wherein said mixing accessory comprises a hollow sleeve forming a conduit.

3. The electric food preparation appliance according to claim 2, wherein said hollow sleeve is configured to be engaged on said side support.

4. The electric food preparation appliance according to claim 3, wherein said hollow sleeve forms a funnel.

5. The electric food preparation appliance according to claim 2, further comprising a closing element configured to be engaged on, and to close, one end of said hollow sleeve.

6. The electric food preparation appliance according to claim 5, wherein said closing element forms a container.

7. The electric food preparation appliance according to claim 5, wherein said closing element is configured to be engaged in, and to close, said opening.

8. The electric food preparation appliance according to claim 7, wherein said lid is provided with two side recesses adjacent said opening.

9. The electric food preparation appliance according to claim 1, wherein said mixing accessory has a portion shaped to constitute a spoon.

10. The electric food preparation appliance according to claim 9, wherein said spoon is made of polypropylene.

11. The electric food preparation appliance according to claim 1, further comprising a base for supporting said jar, and wherein said appliance is a blender and said jar is a blender jar.

12. The electric food preparation appliance according to claim 11, wherein said side support extends from said base.

13. The electric food preparation appliance according to claim 12, further comprising a part forming a ring and wherein said side support forms a unit with said ring.

14. The electric food preparation appliance according to claim 12, wherein said base comprises a case and said side support is removable mounted to said case.

15. The electric food preparation appliance according to claim 14, wherein said side support is adapted to occupy a selected one of several different positions relative to said case.

16. The electric food preparation appliance according to claim 1, wherein said appliance has a lower part and said side support is configured to hold said mixing accessory at a horizontal distance from said lower part of said appliance.

17. An electric food preparation appliance comprising: a jar having a bottom and an open top; a rotary working tool installed in said jar to be driven in rotation through said bottom of said jar; a lid for closing said top of said jar and having an opening; a mixing accessory constructed to be installed in said jar through said opening; and a side support member provided to hold said mixing accessory when said mixing accessory is not installed in said jar, wherein:

said mixing accessory comprises a hollow sleeve forming a conduit;
said hollow sleeve is configured to be engaged on said side support; and
said hollow sleeve forms a funnel.

18. The electric food preparation appliance according to claim 17, further comprising a part forming a ring and wherein said side support forms a unit with said ring.

19. An electric food preparation appliance comprising: a jar having a bottom and an open top; a rotary working tool installed in said jar to be driven in rotation through said bottom of said jar; a lid for closing said top of said jar and having an opening; a mixing accessory constructed to be installed in said jar through said opening; a side support member provided to hold said mixing accessory when said mixing accessory is not installed in said jar; and a base for supporting said jar, wherein:

said appliance is a blender and said jar is a blender jar;
said side support extends from said base; and
said base comprises a case and said side support is removable mounted to said case.

20. The electric food preparation appliance according to claim 19, wherein said side support is adapted to occupy a selected one of several different positions relative to said case.

* * * * *